(12) United States Patent
Hasegawa (10) Patent No.: US 11,391,630 B2
(45) Date of Patent: Jul. 19, 2022

(54) SPECTRUM MEASURING DEVICE AND SPECTRUM MEASURING METHOD

(71) Applicant: AZBIL CORPORATION, Tokyo (JP)

(72) Inventor: Norio Hasegawa, Chiyoda-ku (JP)

(73) Assignee: AZBIL CORPORATION, Tokyo (JP)

( * ) Notice: Subject to any disclaimer, the term of this patent is extended or adjusted under 35 U.S.C. 154(b) by 35 days.

(21) Appl. No.: 17/114,561

(22) Filed: Dec. 8, 2020

(65) Prior Publication Data
US 2021/0181024 A1  Jun. 17, 2021

(30) Foreign Application Priority Data

Dec. 11, 2019 (JP) .............................. JP2019-223796

(51) Int. Cl.
*G01J 3/44* (2006.01)
*G01N 21/64* (2006.01)

(52) U.S. Cl.
CPC ........ *G01J 3/4406* (2013.01); *G01N 21/6456* (2013.01); *G01N 2021/6482* (2013.01)

(58) Field of Classification Search
CPC ...... G01J 3/44; G01J 3/4406; G01N 21/6456; G01N 2021/6482; G01N 21/645; G01N 21/6486; G01N 2021/6419; G01N 2021/6421; A61B 5/0075
See application file for complete search history.

(56) References Cited

U.S. PATENT DOCUMENTS 6,317,624 B1 * 11/2001 Kollias .................. A61B 5/444
436/63

* cited by examiner

*Primary Examiner* — Abdullahi Nur
(74) *Attorney, Agent, or Firm* — Oblon, McClelland, Maier & Neustadt, L.L.P.

(57) ABSTRACT

A spectrum measuring device according to the present disclosure includes an accommodation part having a space for accommodating a culture solution containing a medium and cells, a light source device for irradiating a first surface of the space with excitation light, a light receiving device for receiving fluorescence occurring from the first surface, and an arithmetic device for spectral analysis of the fluorescence received by the light receiving device. In the space, the depth from the first surface of a fluorescence region where fluorescence is produced by incident excitation light is a value giving an internal shield of a prescribed level of less in the fluorescence region. The arithmetic device calculates the fluorescence spectrum of the cells by subtracting the fluorescence spectrum of the medium from the spectrum of the fluorescence of the culture solution obtained by the light receiving device.

7 Claims, 9 Drawing Sheets

SPECTRUM MEASURING DEVICE AND SPECTRUM MEASURING METHOD

CROSS-REFERENCE TO RELATED APPLICATIONS

The present application is based on and claims priority to Japanese Application No. 2019-223796, filed Dec. 11, 2019, the entire contents of which are incorporated herein by reference.

BACKGROUND

1. Field of the Disclosure

The present disclosure relates to a spectrum measuring device and a spectrum measuring method for measuring a fluorescence spectrum of a cell.

2. Description of the Related Art

In order to maintain a good metabolic state of a cell in a bio-process, the metabolic state of the cell is measured through analysis of, for example, components of the culture solution by sampling.

In addition, a process control method of performing in-line measurement of Raman spectrum, near-infrared spectrum, or fluorescence spectrum of a culture solution is known. In this process control method, the culture conditions are controlled by, for example, regressing a change in the spectrum to the metabolic state of the cell.

The measurement method by sampling has a risk of contamination at the time of sampling and takes time to obtain the measurement result. In addition, since the method requires human work, it is difficult to reduce the work labor.

In addition, in any of the measurement method by sampling and the process control method described above, the results obtained are basically the results of the entire culture solution containing a medium and cells and are not direct results from the cells. For example, even if a carbon source such as glucose in a culture solution is maintained at a concentration sufficient for cell growth, it is difficult to obtain evidence whether or not the cells used the carbon source as energy. Accordingly, there is a strong desire to directly measure the metabolic state of cells rather than an indirect index obtained from the culture solution.

On the other hand, the autofluorescence of a cell in the visible light region is mainly due to nicotinamide adenine dinucleotide (NADH) or flavin and is closely related to carbon metabolism or aerobic respiration. Accordingly, the metabolic state of a cell can be understood by measuring the autofluorescence of the cell.

SUMMARY

The present disclosure has been made in view of the above circumstances and provides a spectrum measuring device and a spectrum measuring method that precisely measure the fluorescence spectrum derived from cells in a bio-process.

The spectrum measuring device according to the present disclosure includes an accommodation part having a space for accommodating a culture solution containing a medium and cells, a light source device for irradiating a first surface of the space with excitation light, a light receiving device for receiving fluorescence occurring from the first surface, and an arithmetic device for spectral analysis of the fluorescence received by the light receiving device. In the space, the depth from the first surface of a fluorescence region where fluorescence is produced by incident excitation light is a value giving an internal shield of a prescribed level or less in the fluorescence region. In addition, the arithmetic device calculates the fluorescence spectrum of the cells by subtracting the fluorescence spectrum of the medium from the spectrum of the fluorescence of the culture solution obtained by the light receiving device.

According to the present disclosure, accurate information showing the metabolic state of a cell can be obtained by measuring the fluorescence spectrum derived from the cell.

DETAILED DESCRIPTION

Each embodiment will now be described with reference to drawings. In the following descriptions, functions and components that are almost or substantially the same are given the same reference numerals, and explanations thereof are omitted or performed as needed.

First Embodiment

Spectrum Measuring Method

The spectrum measuring method according to a first embodiment is a method for measuring the fluorescence spectrum of cells in a culture solution containing a medium and the cells.

The "cell" in the present specification is, but not limited to, preferably a cell derived from a mammal, for example, a primate such as a human being or a chimpanzee or a rodent such as a mouse, a rat, a guinea pig, or a hamster. In particular, the cell is preferably a CHO cell. In addition, the cell is preferably a cell that is generally used for substance production, for example, a mouse myeloma cell such as NS0 cell or Sp1/2 cell. The cell is not limited to the above and may be, for example, a plant cell, a bacterium, a yeast, or a fungus.

The "medium" in the present specification is a medium having fluidity, for example, a liquid medium. The type of the medium is not limited as long as it has a composition suitable for cell survival and proliferation selected according to the type of the cell to be used. The medium contains, for example, nutrients such as an amino acid, a vitamin, a carbohydrate, and/or a salt. The medium may contain gel or the like as a scaffold for cells. As the medium, but not limited to, for example, an MEM medium, a DMEM medium, a Ham's F-12 medium, or an RPMI1640 medium, or a modified form thereof can be used. When the cell is a CHO cell, it is preferable to use a serum-free synthetic medium, such as CD OptiCHO Medium (manufactured by Thermo Fischer Scientific). The medium may contain a dye that causes autofluorescence, such as phenol red.

The "culture solution" in the present specification refers to a culture solution containing a medium and cells. The culture solution may be, for example, in the process of culturing cells added to a medium or may be a mere mixture of a medium and cells.

Figure 1:
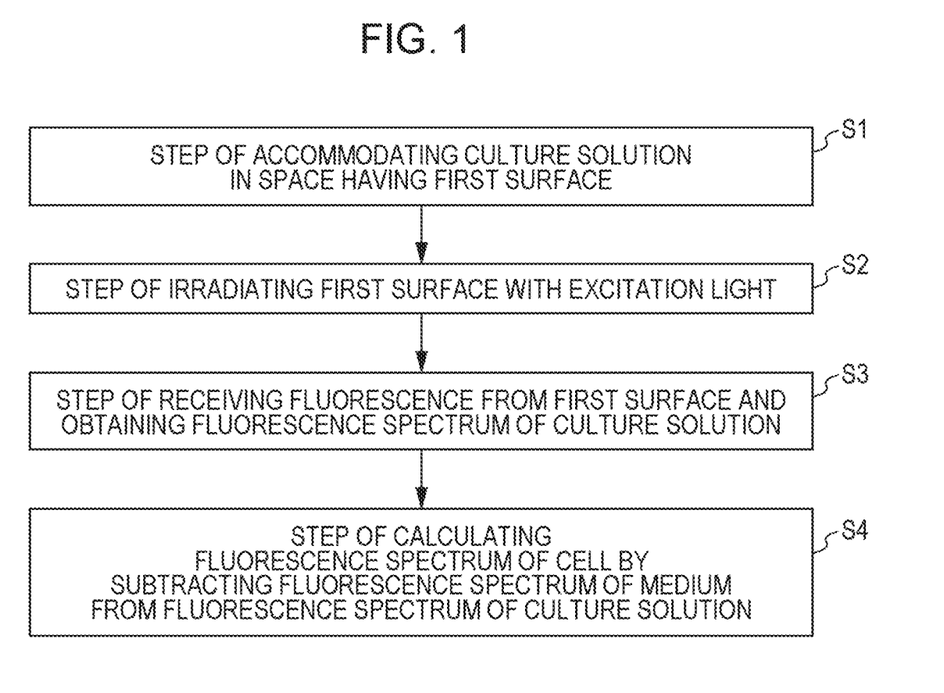
FIG. 1 is a flow chart showing the spectrum measuring method of an embodiment.

The spectrum measuring method according to an embodiment includes, as shown in FIG. 1, the following steps:

Step (S1) of accommodating a culture solution in a space having a first surface, Step (S2) of irradiating the first surface with excitation light, Step (S3) of receiving the fluorescence occurring from the first surface and obtaining a fluorescence spectrum of the culture solution, and Step (S4) of calculating the fluorescence spectrum of the cells by subtracting the fluorescence spectrum of the medium from the fluorescence spectrum of the culture solution.

An example of the spectrum measuring method of the first embodiment will now be described in detail.

Figure 2A:
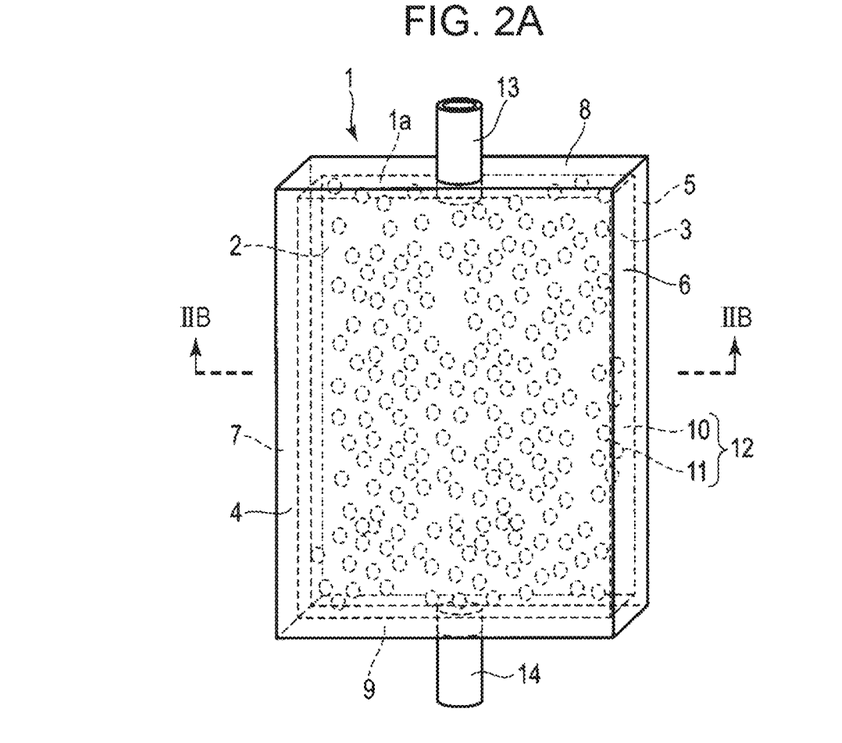
FIGS. 2A and 2B are a perspective view and a cross-sectional view, respectively, illustrating a state of the accommodation part of an embodiment when using.
Figure 2B:
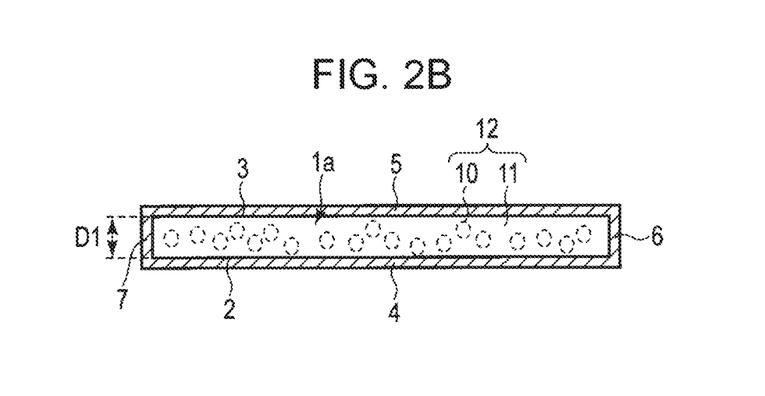

An accommodation part (container) including a space having a first surface is first prepared. FIG. 2A shows a perspective view of an example of an accommodation part 1. FIG. 2B is a cross-sectional view taken along line IIB-IIB of FIG. 2A. The accommodation part 1 is, for example, a rectangular cylindrical container and includes a thin plate-shaped rectangular parallelepiped interior space 1a. Hereinafter, the interior space 1a is also simply referred to as space 1a.

The space 1a includes a first surface 2 having the broadest area and a second surface 3 facing the first surface 2. The accommodation part 1 includes four sidewall portions, i.e., a first sidewall portion 4 provided on the first surface 2 side, a second sidewall portion 5 provided on the second surface 3 side, and a third sidewall portion 6 and a fourth sidewall portion 7 orthogonally adjacent to the first sidewall portion 4 and the second sidewall portion 5, and a top face portion 8, and a bottom face portion 9. That is, the "first surface 2" is also the inner side surface of the first sidewall portion 4, and the "second surface 3" is also the inner side surface of the second sidewall portion 5 of the accommodation part 1.

When the accommodation part 1 is used, the space 1a accommodates a culture solution 12 containing a medium 10 and a cell 11. The top face portion 8 is provided with, for example, a first channel 13 for the culture solution 12 to flow into the space 1a. The first channel 13 is communicated with, for example, culture tank where the cell 11 is cultured. The bottom face portion 9 is provided with, for example, a second channel 14 for discharging the culture solution 12 from the accommodation part 1. For example, the second channel 14 is also communicated with the culture tank.

Although the details will be described later, a fluorescence spectrum of the culture solution 12 is obtained by irradiating the first surface 2 with excitation light through the first sidewall portion 4. Accordingly, at least the first sidewall portion 4 is made of a light-transmitting material. The light-transmitting material is, for example, quartz glass.

The materials and the thicknesses of the second sidewall portion 5, the third sidewall portion 6, the fourth sidewall portion 7, the top face portion 8, and the bottom face portion 9 may be the same as those of the first sidewall portion 4. Alternatively, the materials and the thicknesses may be different, suitable for the container.

The lengths in the major axis direction and the minor axis direction of the first surface 2 are not limited as long as the first surface 2 is larger than the region irradiated with excitation light.

The distance D1 between the first surface 2 and the second surface 3 can be set within a range giving an internal shield of a prescribed level or less. The internal shield refers to the fact that excitation light Ex hits a cell 11 and is scattered and is thereby weakened, and the intensity of the fluorescence Em to be generated is consequently also weakened. The term "prescribed level or less" refers to the fact that the decreasing rate of the fluorescence intensity by the internal shield, i.e., the shielding amount is negligibly low.

The distance D1 giving an internal shield of a prescribed level or less varies depending on, for example, the types of the cell and medium and is not limited and can be determined based on the results of preliminary experiments.

For example, the distance D1 is preferably about 10 times or less the diameter of a cell 11. The diameter of the cell 11 may be the diameter when the cell 11 is assumed to be spherical and may be, for example, the mean of the major and minor diameters of the cell 11. The diameter of the cell 11 may be the average of the whole cell population to be used. The diameter of a cell 11 can be measured by, for example, flow cytometry or microscopic image analysis. Alternatively, past findings regarding the diameter of a cell 11 may be used.

The lower limit of the distance D1 may be a value allowing the cell 11 to enter the space 1a of the accommodation part 1 and is preferably, for example, about 8 times the diameter of the cell 11.

Although the length of the distance D1 is not limited, it is preferably, for example, 100 μm or less and further preferably within a range of 80 μm or more and 100 μm or less.

After the accommodation part 1 is prepared, for example, a culture solution 12 is sent from the culture tank into the inside of the accommodation part 1 through the first channel 13 to accommodate the culture solution 12 in the accommodation part 1 (Step (S1)), and the first surface 2 is irradiated with excitation light Ex (Step (S2)).

Figure 3A:
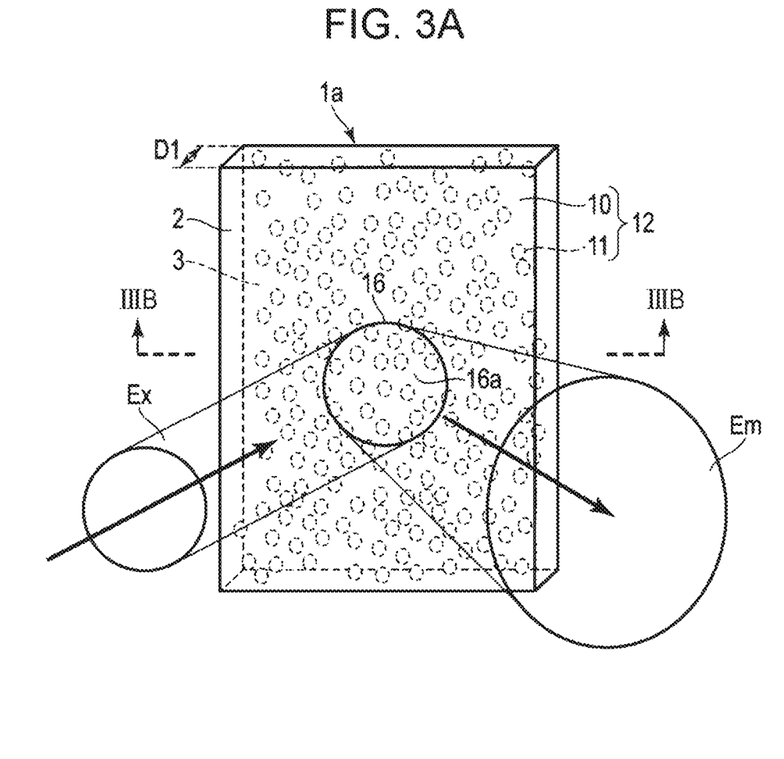
FIGS. 3A and 3B are a perspective view and a cross-sectional view, respectively, illustrating a state of the interior space of the accommodation part of an embodiment when using.
Figure 3B:
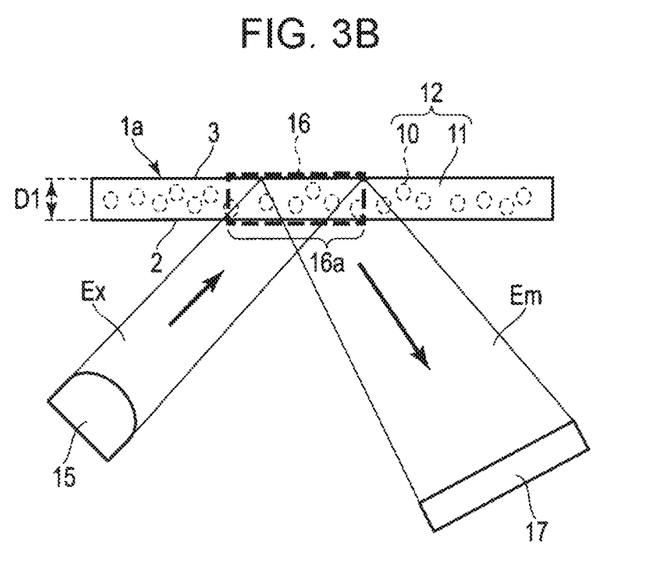

Step (S2) will be described using FIGS. 3A and 3B. FIG. 3A is a perspective view illustrating the interior space 1a of the accommodation part 1, where the first sidewall portion 4, the second sidewall portion 5, the third sidewall portion 6, the fourth sidewall portion 7, the top face portion 8, the bottom face portion 9, the first channel 13, and the second channel 14 of the accommodation part 1 are omitted. FIG. 3B is a cross-sectional view taken along line IIIB-IIIB of FIG. 3A. Incidentally, in FIG. 3A, a light source device 15 and a light receiving device 17 are omitted.

In Step (S2), for example, the first surface 2 is irradiated with excitation light Ex using the light source device 15. The light source device 15 includes, for example, a light source such as an LED light. The light source device 15 may include, for example, a filter that changes the wavelength of the excitation light Ex.

Fluorescent materials in the medium 10 and the cells 11 of the culture solution 12 hit by excitation light Ex through irradiation with the excitation light Ex are excited to generate fluorescence Em. The fluorescence Em can be emitted in all directions regardless of the incident angle of the excitation light Ex. The fluorescence Em is received by the light receiving device 17 arranged at a position where the fluorescence Em can be received. The light receiving device 17 is preferably arranged at a position where the reflected light generated by reflection of the excitation light Ex at an angle symmetrical to the incident angle is avoided from being detected. For example, it is possible to avoid detection of reflection light by setting the incident angle of the excitation light Ex at 60° with respect to the first surface 2 and arranging the light receiving device at a position of 30°. The excitation light Ex is irradiated through, for example, the first sidewall portion 4 (not shown). The angle of the irradiation can be adjusted such that the above-mentioned incident angle is obtained when passed through the first sidewall portion 4. Alternatively, the thickness of the first sidewall portion 4 may be reduced to a degree that the incident angle of the excitation light Ex is not substantially affected.

When the distance D1 is set to about 8 times or more and about 10 times or less the diameter of the cell 11, the depth of the region where fluorescence Em is generated by incidence of excitation light Ex (hereinafter, referred to as "fluorescence region 16") in the space 1a can be about 8 times or more and about 10 times or less the diameter of the cell 11. Here, the fluorescence region 16 is a cylindrical three-dimensional region having a bottom face 16a that is an almost circular region of the first surface 2 where the excitation light Ex hits and a height that is the depth to which the excitation light Ex reaches (in this example, the distance D1). Here, the term "depth" refers to the distance from the first surface 2 in the direction toward the second surface 3 perpendicular to the first surface 2.

The size of the bottom face 16a of the fluorescence region 16 is set such that the cells 11 can be present in the fluorescence region 16 and is determined according to the concentration of the cells 11, the difference in the fluorescence intensities of the medium 10 and the cells 11. The position of the bottom face 16a may be any position on the first surface 2 and is preferably about the middle such that the bottom face 16a does not overlap the edge of the first surface 2.

For example, it is preferable to irradiate excitation lights Ex with different wavelengths within a range of 300 to 500 nm in Step (S2) and to receive the fluorescence Em at each wavelength in Step (S3). Alternatively, light reception may be performed with certain excitation light Ex. The light receiving device 17 may be, for example, a general fluorescence sensor. The light receiving device 17 can detect, for example, the wavelength and intensity of the received fluorescence Em.

A fluorescence spectrum of the culture solution 12 is produced from the thus-obtained wavelength and intensity of the fluorescence Em (light reception data). An example of the fluorescence spectrum at a certain excitation light Ex wavelength is shown in (a) of FIG. 4. In this graph, the vertical axis indicates the intensity of fluorescence Em, the horizontal axis indicates the wavelength of the fluorescence Em, and the fluorescence Em intensity at each of a plurality of fluorescence Em wavelengths is shown. This graph shows the fluorescence spectrum of the entire culture solution 12 and is a mixture of a fluorescence spectrum of the medium 10 and a fluorescence spectrum of the cells 11.

Figure 4:
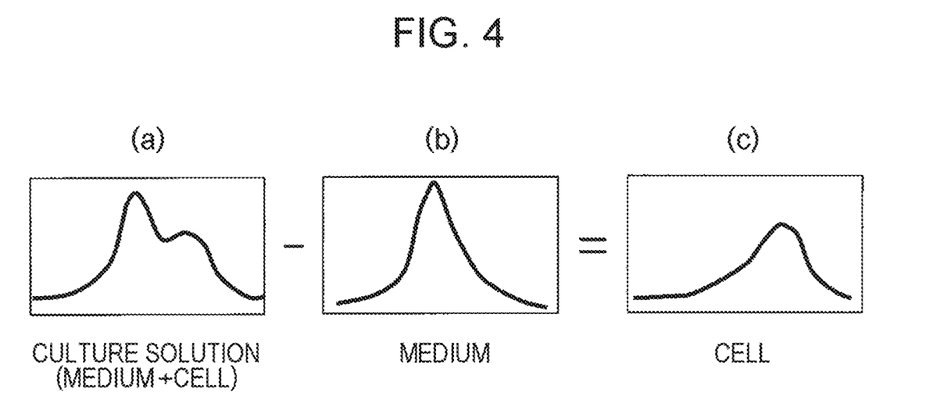
FIG. 4 shows graphs of an example of the fluorescence spectra obtained by the spectrum measuring method of an embodiment.

The fluorescence spectrum ((c) of FIG. 4) of the cells 11 is then obtained by subtracting the fluorescence spectrum ((b) of FIG. 4) of the medium 10 from the fluorescence spectrum ((a) of FIG. 4) of the culture solution 12 (Step (S4)). For example, the fluorescence spectrum of cells 11 is the value obtained by subtracting the fluorescence Em intensity of the medium 10 from the fluorescence Em intensity of the culture solution 12 at each of a plurality of fluorescence Em wavelengths.

The fluorescence spectrum of the medium 10 is measured in advance and can be obtained by, for example, accommodating the medium 10 not containing cells 11 in the same accommodation part 1, irradiating the medium 10 with excitation light Ex as in Step (S2), and measuring the wavelength and intensity of obtained fluorescence Em using the same light receiving device 17.

Figure 5:
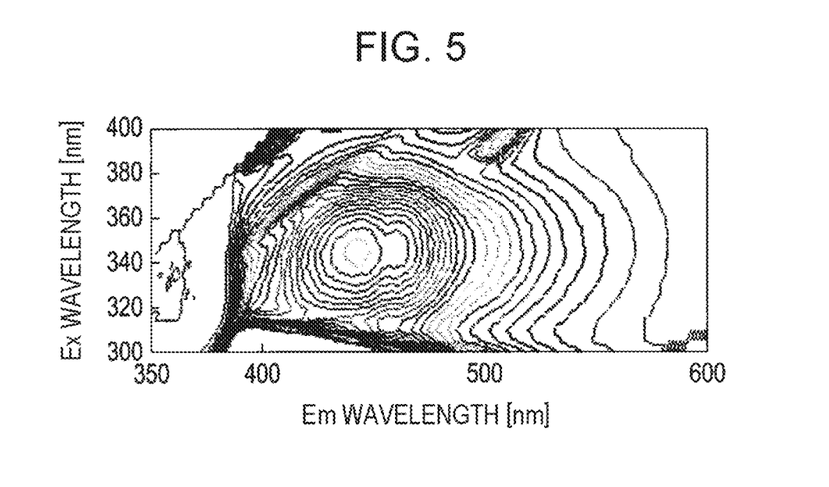
FIG. 5 is a graph showing an example of the fluorescence spectrum obtained by the spectrum measuring method of an embodiment.

In Steps (S3) and (S4), a fluorescence spectrum including the results of fluorescence Em wavelengths and intensities with a plurality of excitation lights Ex may be produced and used. Such a fluorescence spectrum may be shown by a three-dimensional graph of the excitation light Ex wavelength, the fluorescence Em wavelength, and the fluorescence intensity. For example, as shown in FIG. 5, the vertical axis may indicate the excitation light Ex wavelength, the horizontal axis may indicate the fluorescence Em wavelength, and the fluorescence intensity may be indicated by contour or color.

The spectrum of cells 11 excluding the spectrum of the medium 10 can be obtained by the above steps.

The culture solution 12 used in the above method can be returned to the culture tank again through a second channel 14.

According to the spectrum measuring method of the embodiment, the spectrum of cells 11 excluding the spectrum of the medium 10 can be precisely measured. In particular, according to the present method, even if a medium containing a dye is used, the spectrum of cells 11 can be precisely obtained. One reason thereof will now be described.

In known measuring methods, when the fluorescence of cells is relatively weak, in particular, for example, when a medium containing a dye is used, the spectrum of the cells is hidden by the spectrum of the medium, the fluorescence spectrum of the cells obtained by subtracting the fluorescence spectrum of the medium from the fluorescence spectrum of the culture solution may be minus, thereby obtaining an incorrect fluorescence spectrum of the cells. In addition, when an internal shield is likely to occur, for example, when the culture solution contains particles such as cells, a correct spectrum of the cells cannot be obtained due to the internal shield in some cases. Even if a surface measurement method is used in order to avoid the internal shield, excitation light goes deep, in particular, in a sample containing particles, the internal shield highly affects the results in some cases.

When the influence of the internal shield is large, as shown in the following expressions (1) and (2), since the fluorescence of cells depends on two parameters, the shielding amount depending on the cell density and the fluorescence intensity of cells, quantitative treatment is difficult.

$$I_{cell}=I_{sus}(Ex)-I_{broth}(Ex) \qquad (1)$$

$$Ex=Ex_0 \times B \qquad (2)$$

Here, $I_{cell}$ is fluorescence of the cell, $I_{sus}$ (Ex) is fluorescence of the culture solution at an excitation light intensity Ex, $I_{broth}$(Ex) is fluorescence of the medium at an excitation light intensity Ex, Ex is the excitation light intensity after shielding by the cell, $Ex_0$ is the intensity of the irradiated excitation light, and B is the shielding amount.

However, in the method according to the first embodiment, the depth of the fluorescence region 16 is set to be shorter than ever. Consequently, the number of cells entering the fluorescence region 16, the cell density, can be restricted to a lower level, and the internal shield can be weakened to a level not affecting the fluorescence of the cells 11. As a result, it is not necessary to consider the above expression (2), and the fluorescence derived from the cells 11 can be extracted by the expression (1).

In addition, according to the method of the embodiment, the amount of THE medium 10 entering the fluorescence region 16 can also be restricted to a lower level, and the fluorescence from the medium 10 can be reduced. Consequently, the fluorescence of the cells 11 can be prevented from being hidden by the fluorescence of the medium 10.

In addition, the fluorescence spectrum of cells can be obtained in-line, without sampling the culture solution from the cell culture apparatus, by using the accommodation part 1 according to the embodiment. Consequently, the labor of sampling is cut, and contamination is also prevented. In addition, the loss in the culture solution can be minimized by returning the culture solution subjected to the analysis to the culture tank.

Figure 6:
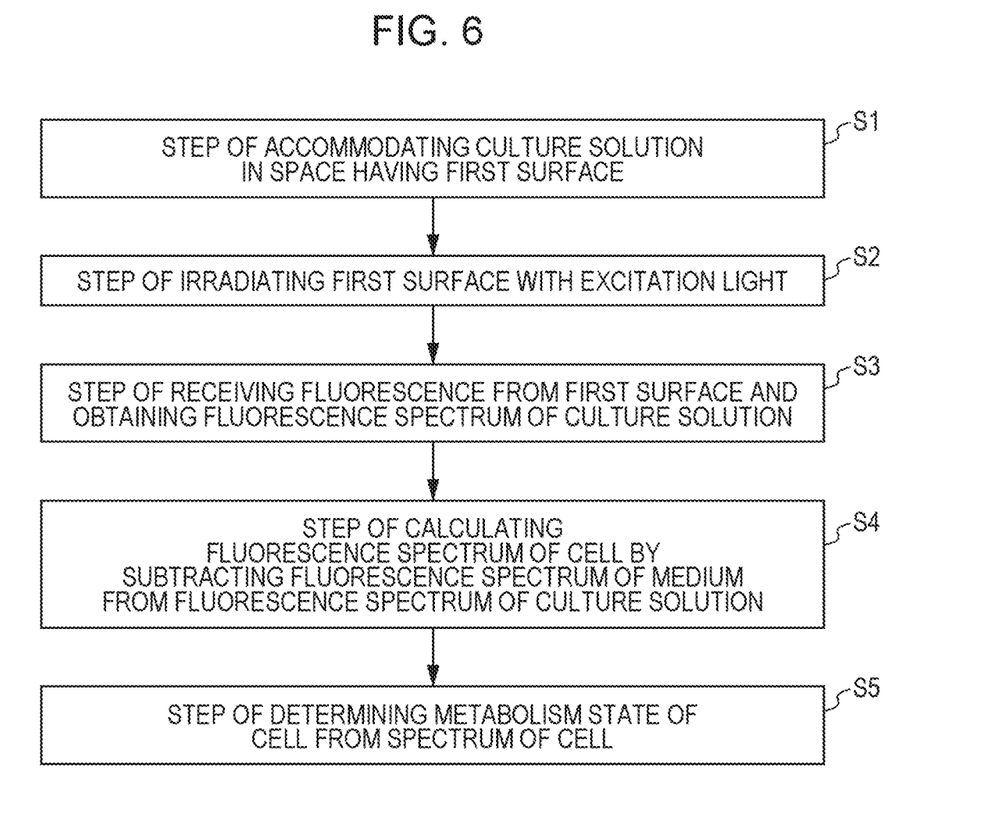
FIG. 6 is a flow chart showing the spectrum measuring method of an embodiment.

In a further embodiment, as shown in FIG. 6, the spectrum measuring method may further include Step (S5) of determining the metabolic state of the cells 11 from the fluorescence spectrum of the cells 11 obtained in Step (S4). The metabolic state of the cells 11 can be determined by, for example, as follows.

The fluorescence spectrum of the cells 11 represents the spectrum of autofluorescence of the cells 11 mainly derived from, for example, NADH or flavin used for energy generation (aerobic respiration, carbon metabolism) in the cells 11. Accordingly, for example, information, such as peak wavelengths of the excitation light Ex and fluorescence Em, from the fluorescence spectrum can be linked to the metabolic state of the cells 11. For example, a threshold is set in the intensity of the peak wavelength, and the cells can be judged to be a necrotic state when the intensity of the peak wavelength is lower than the threshold and to be a survival state when the intensity of the peak wavelength is higher than the threshold.

According to Steps (S1) to (S4), the fluorescence spectrum derived from cells can be precisely measured, and accurate information showing the metabolic state of the cells can be obtained. Accordingly, the metabolic state of the cells in Step (S5) can be more precisely judged.

Furthermore, in the cell culture, it is possible to maintain the metabolic state of the cells 11 in a good state by changing the temperature, pH, nutrition quantity, dissolved oxygen amount, and so on in the culture tank based on the fluorescence spectrum of the cells 11 and/or the metabolic state of the cells obtained by the above-described method. For example, when substance production is performed using cells 11, efficient substance production can be stably performed.

In a further embodiment, the first surface 2 and the second surface 3 do not have to be flat surfaces. For example, the accommodation part 1 may be a container shaped like a tubular channel. In such a case, the diameter of the channel may be set as in the depth of the fluorescence region 16.

In a further embodiment, the accommodation part 1 is not communicated with the culture tank and may be provided separately from the culture apparatus. In such a case, it is also possible to perform the above method by collecting a part of the culture solution 12 from the culture tank with a pipette, a syringe, or the like and accommodating it in the accommodation part 1.

Spectrum Measuring Device

The spectrum measuring device according to the first embodiment makes quantitative treatment easy. The spectrum measuring device according to the first embodiment will now be specifically described.

Figure 7:
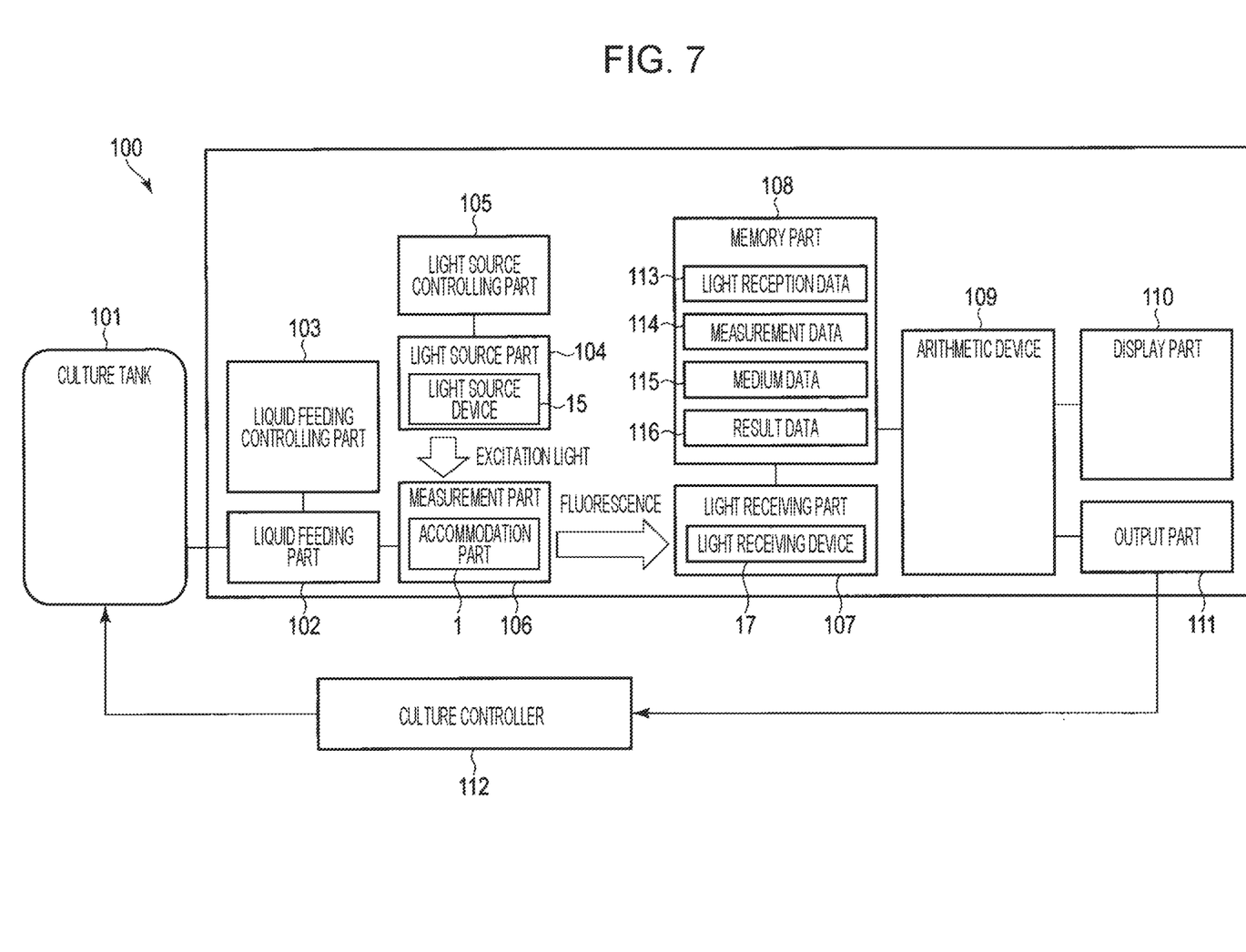
FIG. 7 is a block diagram showing the spectrum measuring device of an embodiment.

FIG. 7 is a block diagram showing an example of the configuration of the spectrum measuring device 100 according to the first embodiment.

The spectrum measuring device 100 includes a culture tank 101, a liquid feeding part 102, a liquid feeding controlling part 103, a light source part 104, a light source controlling part 105, a measurement part 106, a light receiving part 107, a memory part 108, an arithmetic device 109, a display part 110, an output part 111, and a culture controller 112.

The culture tank 101 stores a culture solution 12 containing cells 11 as a culture target and a medium 10 inside, and the cells 11 are cultured therein. The culture tank 101 has functions such as ventilation, stirring, and replenishment of various materials. In addition, in the culture tank 101, sensors for detecting the environmental conditions in the tank, such as a temperature sensor, a pH sensor, and a dissolved oxygen sensor, and a reagent pod for adding reagents (e.g., a defoaming agent, a pH adjuster, etc.) to the culture tank 101 are provided.

The liquid feeding part 102 sends the culture solution 12 from the culture tank 101 to the measurement part 106 via, for example, a channel.

The liquid feeding controlling part 103 controls the feeding of the culture solution 12 by the liquid feeding part 102.

The measurement part 106 includes an accommodation part 1. The accommodation part 1 is any of the above. The measurement part 106 receives, for example, the culture solution 12 as the measuring object from the culture tank 101 via the liquid feeding part 102 and accommodates the culture solution 12 in the accommodation part 1.

The light source part 104 includes a light source device 15 that can irradiate excitation lights Ex of different wavelengths and irradiates excitation light toward the measurement part 106 from the light source device 15.

The light source controlling part 105 controls the irradiation of excitation light by the light source part 104.

The light receiving part 107 includes a light receiving device 17 that receives the fluorescence occurring from the accommodation part 1 of the measurement part 106. The light receiving part 107 stores the light reception data 113 showing the light receiving results in a memory part 108.

The memory part 108 is, for example, a nonvolatile memory device.

The memory part 108 stores the light reception data 113.

The memory part 108 stores measurement data 114 generated by the arithmetic device 109. The measurement data 114 includes the result of spectral analysis for the light reception data 113, specifically, the fluorescence spectrum measured at each wavelength.

The memory part 108 stores the medium data 115 including the spectrum of a medium in advance. The medium data 115 include fluorescence spectrum of the medium at each wavelength.

The memory part 108 stores result data 116 generated by an arithmetic device 109 as described later. The result data 116 include the fluorescence spectrum of cells at each wavelength.

The arithmetic device 109 reads out the light reception data 113 from the memory part 108 and executes spectral analysis for the light reception data 113. The arithmetic device 109 finds fluorescence spectrum measured at each wavelength by spectral analysis, generates measurement data 114 including fluorescence spectrum measured at each wavelength, and stores the measurement data 114 in the memory part 108.

The arithmetic device 109 calculates result data 116, which are the results of analysis of the fluorescence spectrum of cells, based on the medium data 115 and the measurement data 114 stored in the memory part 108. More specifically, the arithmetic device 109 calculates the fluorescence spectrum of cells at each wavelength by subtracting the fluorescence spectrum of the medium from the measured fluorescence spectrum at each wavelength and generate the result data 116. Then, a calculation part stores the result data 116 in the memory part 108.

In addition, the arithmetic device 109 controls the display and output of various data stored in the memory part 108.

The display part 110 displays various data according to the control by the arithmetic device 109.

The output part 111 outputs various data or a control signal to the culture controller 112 according to the control by the arithmetic device 109.

The culture controller 112 controls ventilation, stirring, replenishment of various materials, opening and closing of a valve, etc. in the culture tank 101 based on the various data (particularly, the result data 116) or the control signal received from the output part 111.

The result data 116 generated by the above-described spectrum measuring device can be used for understanding the metabolic state of cells and process control in a bioprocess.

In a further embodiment, the arithmetic device 109 may judge the metabolic state of cells 11 based on the result data 116 and store the result in the memory part, and the culture controller 112 may control the culture tank 101 based on the resulting metabolic state. The metabolic state of cells 11 may be displayed on the display part 110.

Second Embodiment

Figure 8A:
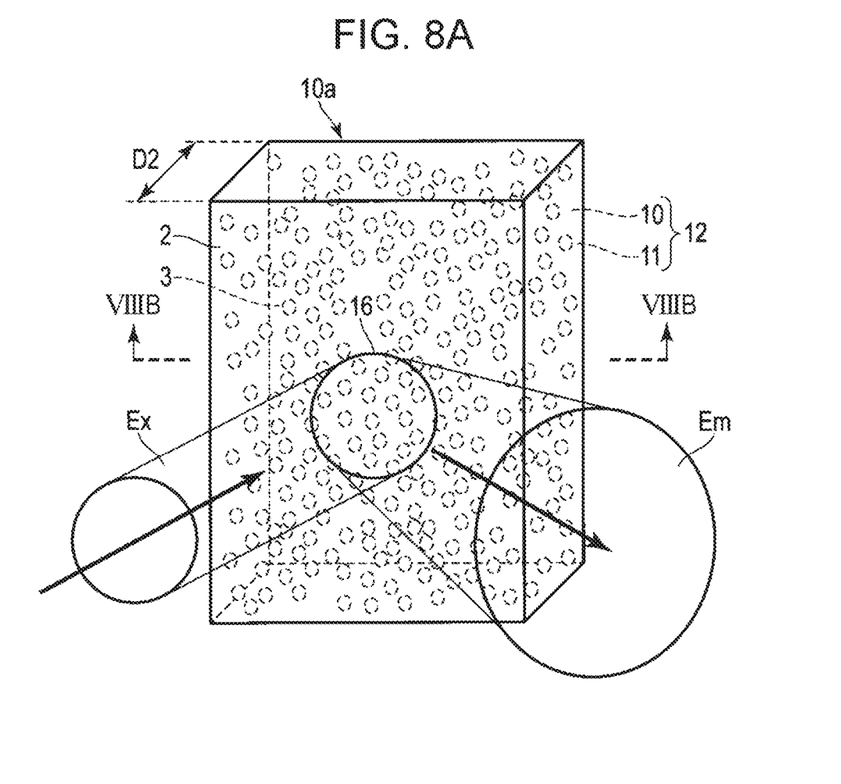
FIGS. 8A and 8B are a perspective view and a cross-sectional view, respectively, illustrating a state of the interior space of the accommodation part of an embodiment when using.
Figure 8B:
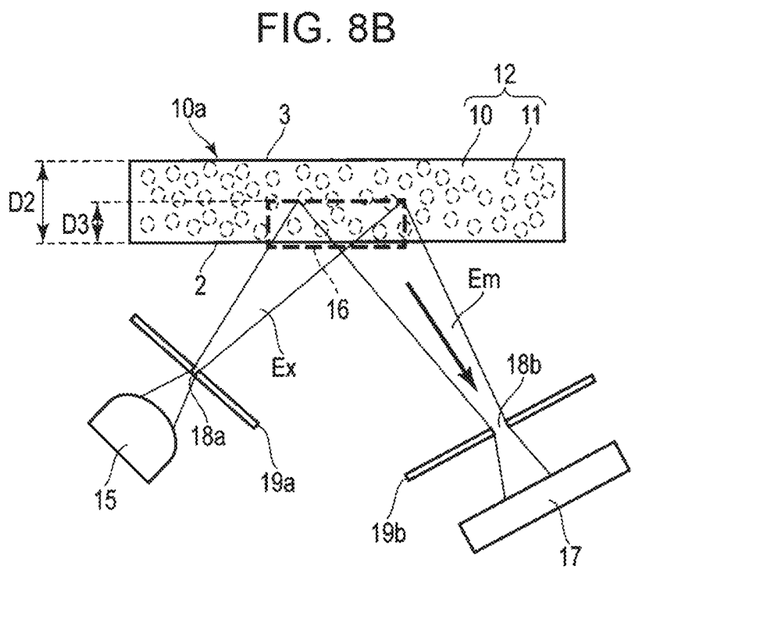

A second embodiment will be described using FIG. 8A and FIG. 8B which is a cross-sectional view taken along line VIIIB-VIIIB of FIG. 8A. The accommodation part used in the second embodiment includes a space 10a in which the distance D2 between a first surface 2 and a second surface 3 is larger than a length giving an internal shield of a prescribed level or less.

When such an accommodation part is used, the depth (distance D3) of the fluorescence region 16 can be set such that the internal shield is a prescribed level or less by adjusting the excitation light Ex and the depth of focus of the light receiving device 17 such that in Step (S2), the fluorescence Em in a region from the first surface 2 of the space 1a to the depth giving an internal shield of a prescribed level or less is detected. Consequently, an internal shielding effect can be obtained.

For example, it can be implemented by adjusting the depth of focus such that the excitation light Ex is focused within the fluorescence region 16 of the above depth. The depth of focus can be adjusted by, for example, a first focus adjustment mechanism provided between the first surface 2 and the light source device 15. For example, the first focus adjustment mechanism is, for example, a plate 19a provided with a pin hole 18a as shown in FIG. 8B. For example, the depth of focus can be adjusted by changing the position of the plate 19a from the light source device 15 or the size of the pin hole 18a.

In addition, it is preferable to also arrange a second focus adjustment mechanism of a plate 19b provided with a pin hole 18b between the light receiving device 17 and the first surface 2. The fluorescence Em occurring from the focus plane at a desired depth of focus can be detected by arranging the second focus adjustment mechanism on the light receiving device 17 side, and detection of the fluorescence Em occurring from undesired depth can be prevented.

The distance D3 is preferably any value within a range of 8 times or more and 10 times or less the diameter of the cell 11. In addition, the distance D3 is preferably 100 μm or less and more preferably 80 μm or more and 100 μm or less.

Step (S1), Step (S3), and Step (S4) and Step (S5) as needed can be performed as in the first embodiment. In addition, the method of the second embodiment can be performed by using a spectrum measuring device. The spectrum measuring device in this example is the same as that in the first embodiment except that the distance between the first surface 2 and the second surface 3 of the accommodation part is larger than a length giving an internal shield of a prescribed level or less, a focus adjustment mechanism is provided, and the light source controlling part 105 can control the excitation light and the depth of focus of the fluorescence light receiving device.

According to the second embodiment, even if a container in which the distance between the first surface 2 and the second surface 3 is larger than a length giving an internal shield of a prescribed level or less, the internal shield can be prevented, and the spectrum of cells can be precisely measured.

Incidentally, in also the first embodiment, the depth of focus may be adjusted such that the fluorescence light receiving device is focused within the fluorescence region 16.

EXAMPLES

Examples of using the spectrum measuring method of the embodiment will now be described.

Example 1

Example 1 shows an example of obtaining a fluorescence spectrum of a yeast using the accommodation part of the first embodiment. Dry bread yeast cells (*Saccharomyces cerevisiae*, average diameter: about 10 μm) were centrifugated and washed once using pure water and were then suspended in a medium or pure water to prepare each culture solution. The cell particles were counted with a cell counter (trade name: TC-20, manufactured by Bio-Rad Laboratories, Inc.), and the densities of yeast were adjusted to the same. The suspensions were each accommodated in a chamber having a width thickness of 100 μm of a cell counter slide, and surface photometry was performed with a fluorescence spectrophotometer (trade name: FP8500, manufactured by JASCO Corporation) to obtain a fluorescence spectrum. The excitation light Ex was irradiated to the chamber surface in an approximately circular shape having a radius of about 2 mm. In addition, the fluorescence spectrum of the medium only was measured as in above.

Figure 9A:
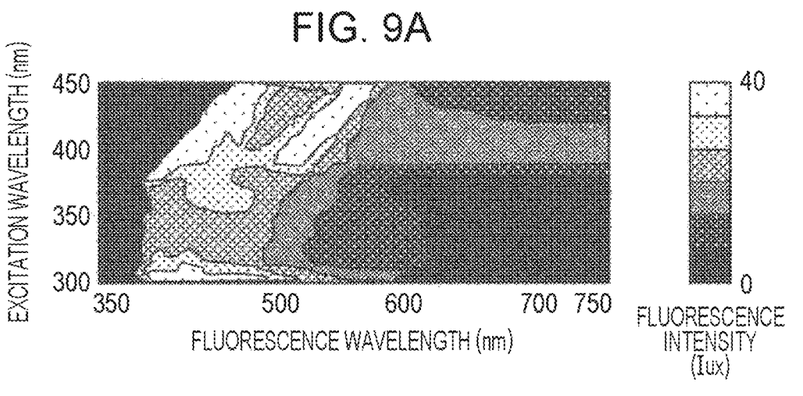
FIGS. 9A and 9B are fluorescence spectra showing the result of Example 1.
Figure 9B:
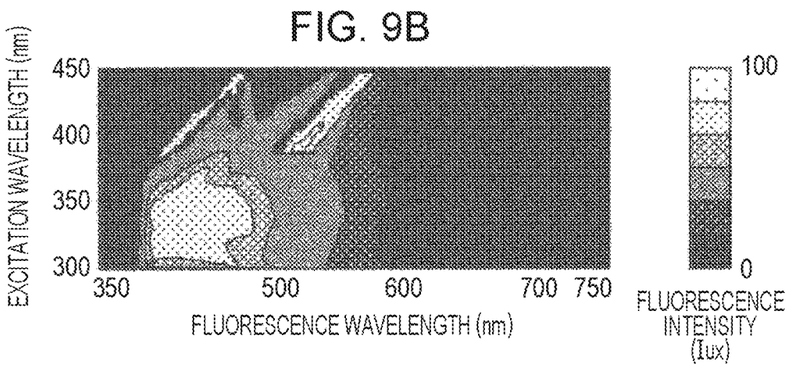

The fluorescence spectrum of the medium only was subtracted from the obtained fluorescence spectrum. The result is shown in FIGS. 9A and 9B. The vertical axis of each of the graphs shown in FIGS. 9A and 9B indicates the wavelength of excitation light Ex, and the horizontal axis indicates the wavelength of obtained fluorescence Em. FIG. 9A shows the fluorescence spectrum of the culture solution. FIG. 9B shows the fluorescence spectrum of cells obtained by subtracting the fluorescence spectrum of the medium from the fluorescence spectrum of the culture solution.

In FIG. 9B, at the position of excitation light of 340 nm and fluorescence of 460 nm showing the peak wavelength of the autofluorescence of the cell, fluorescence having an intensity of about 70 to 80 was observed. This intensity revealed that the fluorescence peak was present at approximately the same position as that of the fluorescence when the yeast was suspended in pure water and that the fluorescence spectrum of the cell was precisely obtained.

Comparative Example 1

Figure 10:
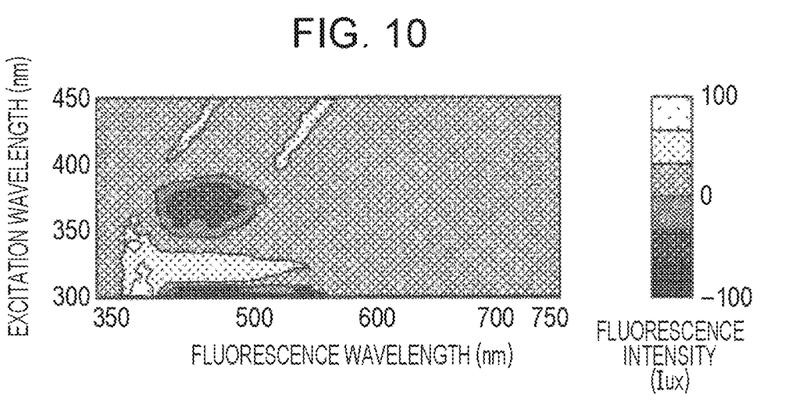
FIG. 10 is a fluorescence spectrum showing the result of Comparative Example 1.

The fluorescence spectrum of a culture solution was obtained by the same method as in Example 1 using a chamber having a thickness of 3 mm, and the fluorescence spectrum of the medium was subtracted therefrom. The result is shown in FIG. 10. Fluorescence having an intensity of about −50 was observed at the position of excitation light of 340 nm and fluorescence of 460 nm showing the peak wavelength of the autofluorescence of the cell. This result demonstrates that the fluorescence intensity of the medium was higher than that of the cell and that the fluorescence spectrum of the cell is hidden and was therefore not precisely measured.

Example 2

Figure 11:
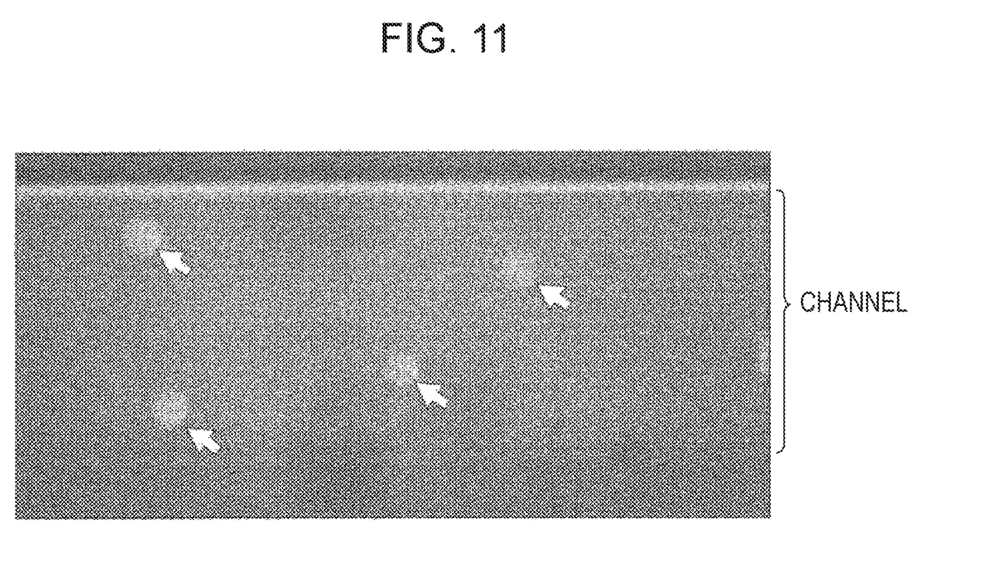
FIG. 11 is a photomicrograph showing the result of Example 2.

Example 2 shows an example of obtaining a fluorescence spectrum of a yeast using the accommodation part (channel) of the first embodiment. The yeast was suspended in a medium, and the suspension was let to flow in a channel having a thickness of 80 μm and was photographed with a microscope. The photomicrograph is shown in FIG. 11. As shown in FIG. 11, the yeast was clearly observed without being hidden by the fluorescence of the medium.

What is claimed is:

1. A spectrum measuring device comprising:
   an accommodation part having a space for accommodating a culture solution containing a medium and a cell;
   a light source device for irradiating a first surface of the space with excitation light;
   a light receiving device for receiving fluorescence occurring from the first surface; and
   an arithmetic device for spectral analysis of the fluorescence received by the light receiving device, wherein
   in the space, a depth from the first surface of a fluorescence region where fluorescence is produced by incident excitation light is a value giving an internal shield of a prescribed level of less in the fluorescence region; and
   the arithmetic device calculates a fluorescence spectrum of the cell by subtracting a fluorescence spectrum of the medium from a spectrum of the fluorescence of the culture solution obtained by the light receiving device.

2. The spectrum measuring device according to claim 1, wherein the depth from the first surface of the fluorescence region is a value of 8 times or more and 10 times or less the diameter of the cell.

3. The spectrum measuring device according to claim 1, wherein
   the depth of the fluorescence region is smaller than a distance from the first surface to a second surface facing the first surface; and
   a focus adjustment mechanism is provided between the light source device and the first surface, and a focus adjustment mechanism is provided between the light receiving device and the first surface.

4. The spectrum measuring device according to claim 1, wherein a distance from the first surface to a second surface facing the first surface is a value of 8 times or more and 10 times or less the diameter of the cell.

5. The spectrum measuring device according to claim 4, wherein the distance is a value of 80 μm or more and 100 μm or less.

6. The spectrum measuring device according to claim 1, wherein
   the spectrum obtained by the light receiving device includes a fluorescence intensity of the culture solution at each of a plurality of fluorescence wavelengths;
   the spectrum of the medium includes a fluorescence intensity of the medium at each of a plurality of fluorescence wavelengths; and
   the spectrum of the cell is a value obtained by subtracting the fluorescence intensity of the medium from the fluorescence intensity of the culture solution at each of a plurality of fluorescence wavelengths.

7. A spectrum measuring method for measuring a fluorescence spectrum of a cell in a culture solution containing a medium and the cell, comprising:
   accommodating the culture solution in a space having a first surface;
   irradiating the first surface with excitation light;
   receiving fluorescence occurring from the first surface and obtaining a fluorescence spectrum of the culture solution; and
   calculating a fluorescence spectrum of the cell by subtracting a fluorescence spectrum of the medium from the fluorescence spectrum of the culture solution, wherein
   in the space, a depth from the first surface of a fluorescence region where fluorescence is produced by incident excitation light is a value giving an internal shield of a prescribed level of less in the fluorescence region.

* * * * *